Fig. 2.

No. 746,868. PATENTED DEC. 15, 1903.
S. A. MOULTON.
PLAYING CARDS.
APPLICATION FILED SEPT. 10, 1900. RENEWED JUNE 11, 1903.
NO MODEL. 4 SHEETS—SHEET 3.

Fig. 3.

Witnesses
Palmer A. Jones
Ethel A. Fry

Inventor
Sarah A. Moulton
By Luther V. Moulton
Attorney

No. 746,868.                                    Patented December 15, 1903.

UNITED STATES PATENT OFFICE.

SARAH A. MOULTON, OF GRAND RAPIDS, MICHIGAN, ASSIGNOR OF ONE-HALF TO LUTHER V. MOULTON, OF GRAND RAPIDS, MICHIGAN.

PLAYING-CARDS.

SPECIFICATION forming part of Letters Patent No. 746,868, dated December 15, 1903.

Application filed September 10, 1900. Renewed June 11, 1903. Serial No. 161,087. (No model.)

*To all whom it may concern:*

Be it known that I, SARAH A. MOULTON, a citizen of the United States, residing at Grand Rapids, in the county of Kent and State of Michigan, have invented certain new and useful Improvements in Combined Playing and Educational Cards; and I do hereby declare the following to be a full, clear, and exact description of the invention, such as will enable others skilled in the art to which it appertains to make and use the same.

My invention relates to improvements in playing-cards, and more especially to such cards when adapted for educational purposes or for cartomancy, commonly known as "card-reading" or "fortune-telling."

Heretofore attempts have been made to so adapt playing-cards by providing the same with other and different symbols from those on the cards in common use, but all such cards have been thereby rendered unsuitable for use in place of the ordinary cards for playing the usual card games. Other cards have been made retaining the usual symbols either unchanged or sufficiently so to be recognized and used to play the usual games and adding thereto other symbols or printed matter, or both, to adapt them for the other uses named. Such cards are objectionable, for that they are encumbered with a double set of symbols, and also for that they retain the symbols of the ordinary cards.

The object of my invention is to provide playing-cards with a single series of symbols adapted to serve in place of the symbols of the ordinary cards and at the same time well adapted for educational purposes and for cartomancy, to provide cards with new and useful symbols for educational purposes, to provide cards with new and useful symbols for cartomancy, to provide cards with new and useful symbols for playing special games, to provide cards with new and useful symbols for playing the usual card games and at the same time well adapted for playing special games, for educational purposes, and for cartomancy, and to provide the same with certain new and useful features hereinafter more fully described, and particularly pointed out in the claims.

My invention consists, essentially, in providing the cards with a single series of symbols adapted to be substituted for the usual symbols on the cards in common use, and adapting the cards to be used in playing the ordinary card games, each suit also displaying a separate color, three of said colors being primary and the other a mixed color, thus adapting the cards for the other uses named, each suit also displaying separate geometrical figures, primary in character, and adapting the cards for said other uses, the court-cards of each suit also displaying symbols adapted to serve in place of the usual kings, queens, and jacks, and at the same time representing variously related, natural, or artificial objects, whereby the same symbols adapt the cards for the said other uses, and in the combination and arrangement of these various colors, figures, and symbols, whereby a single series of symbols adapt the cards to all the various purposes above enumerated, as will hereinafter more fully appear by reference to the accompanying drawings, in which—

Figures 1, 2, 3, and 4, respectively, represent four several suits of thirteen cards each, which cards embody my invention, the pip-cards being shown on a reduced scale and the respective cards numbered in consecutive order from "1" to "52," inclusive. The colors of the respective suits are yellow, blue, red, and black. These colors alone not only serve to distinguish the suits, but also to illustrate the science of colors, of light, and the vibratory theory, and in combination with the various objects represented on the court-cards serve, further, to illustrate various matters of science and philosophy and to aid in cartomancy. The geometrical figures of the pip symbols are the circle, the triangle, the square, and a cross formed of the said three figures combined, each figure being incomplete and the whole symbol closely resembling a Maltese cross. The circle is the simplest possible figure, being bounded by a single curved line, the triangle the simplest possible figure bounded by right lines, and the two taken together show the basic elements of all possible figures, to wit: curved lines, right lines, and angles. The square is the next angular figure in order, and these three figures combine to form a fourth, thus supplying a series of forms analogous to the series of colors. The corresponding solid figures would respectively be a globe, a triangular pyramid, a cube, and a figure composed of a globe and six pyramids, the apex of each pyramid being at the center of the globe, and the base of each pyramid being in one of the planes of the respective sides of a cube.

It is obvious that the described colors may be utilized without the geometrical figures, or the geometrical figures may be utilized without the colors, or both may be used simultaneously. I prefer the latter plan as giving a wider range of utility to the cards.

The first or highest card of each suit shows a symbol consisting of a picture representing one of the spheres of the solar system; suit 1, card 1, a representation of the sun with fifty-two rays divided by the four quadrating rays into four equal parts of thirteen rays each and on a circular yellow ground; suit 2, card 14, a representation of the earth partially covered by clouds and on a triangular blue ground; suit 3, card 27, a representation of the planet Jupiter on a square red ground, and suit 4, card 40, a representation of the moon, showing a dark body and a narrow light crescent at one side and on an incomplete square or cruciform black ground formed of four triangles with one angle of each triangle covered by the disk of the moon.

The second card of each suit shows a symbol consisting of a picture of an ancient temple dedicated to a mythological deity or deities having characteristics and functions appropriate to the nature of the symbols, geometrical figures, or color of the respective suits; suit 1, card 2, a temple dedicated to Apollo; suit 2, card 15, a temple dedicated to Pallas Athene or Minerva; suit 3, card 28, a temple dedicated to Jupiter or Zeus, and suit 4, card 41, a temple first dedicated to numerous gods and afterward to Christianity and showing various styles of architecture.

The third card of each suit shows a symbol consisting of a picture of a modern structure or structures of a character in harmony with the ideas suggested by the color or geometrical figures or symbols of the respective suits; suit 1, card 3, a modern cottage or home with pleasant surroundings; suit 2, card 16, an art-gallery or school of fine arts; suit 3, card 29, a composite picture representing the industries and representing a farm, factories, warehouse, boats, and railway-train; and suit 4, card 42, a prison or house of correction.

The respective ten pip-cards of each suit show from one to ten pips, respectively. The cards of each suit show pips of the respective form or color, or both, appropriate to the other symbols of the suit, the groups of a corresponding number of pips being correspondingly arranged and those of a different number being differently arranged.

The described cards operate as follows: As substitutes for the ordinary cards the circular or yellow pips serve as hearts, the triangular or blue pips as clubs, the square or red pips as diamonds, and the cruciform or black pips as spades. The spheres also serve as kings, the temples as queens, the houses or modern structures as jacks, and the pip-cards as the corresponding cards of the ordinary pack.

The described cards can thus be readily used to play the ordinary games in place of the cards in common use. They are also adapted to play special games involving the significance of the symbols thereon—as, for instance, a game in which the cruciform or black suit count adversely or oppositely to the other cards or a game in which those winning the most points in a suit would win whatever the cards might indicate. In circular or yellow he would win ease, happiness, domestic felicity, &c.; in triangles or blue, fame, success in intellectual pursuits, &c.; in squares or red, wealth, power, dominion, &c.; in crosses or black, defeat, disaster, misfortune, &c., the one having the most points in the latter would be the loser of the game.

The suits are also adapted to be distinguished in various ways, and thus to play games based on these respective features, to wit: by color, as yellow, blue, red, and black; by pip symbol, as circles, triangles, squares, and crosses; by sphere, as sun, earth, Jupiter, and moon; by deities, as Apollo, Pallas Athene, Jupiter or Zeus, and Diana.

For purposes of instruction the cards are used as follows: The relation of the particular color or colors, geometrical figure or figures, spheres, temples, houses, or pips, on any particular card or cards to the particular topic under consideration is pointed out and explained, and for this purpose the respective pip-cards may be arbitrarily given a definite significance to indicate some subdivision of the topic. These cards will thus serve as object lessons to illustrate the theme and assist the memory in retaining the lesson. Their utility in this respect relates to a wide range of art, Science, Philosophy, History, Mythology, &c., depending largely on the knowledge of the instructor and capacity of the pupils. No attempt is herein made to fully detail all of such uses, but sufficient only to show a proper basis of novelty, utility, and invention.

In the following table are some of the topics for which these cards are adapted, the topics being arranged on the left and the various related features of the cards opposite the same.

| Topics. | Features of the cards. |
|---|---|
| Light and color. The spectrum. Vibration. Chromatic scale, &c. | The primary colors—red, yellow, and blue—and a neutral mixture of the same, forming black. |
| Geometry. Trigonometry. Drawing, &c. | The circle or sphere, the triangle or triangular pyramid, the square or cube. |

| Topics. | Features of the cards. |
|---|---|
| Astronomy. Nebular hypothesis. Heat. Incandescence. Fusion. Crystallization, &c. | The Sun, the Earth, the planet Jupiter, and the Moon, together with the colors or the forms of the pip symbols, or both. |
| Ancient mythology. Religions, &c. Astrology. | The Sun, the Temple of Apollo, the Earth, the Parthenon, the planet Jupiter, the Moon, and the Pantheon. |
| The four principal results of man's efforts in pursuit of happiness. | The home, card 3; the fine arts, card 16; wealth and power, card 29; the prison, card 42. |

In addition to the direct reference of the separate cards to color, geometrical figure, and the natural and artificial object represented thereon, if the symbols of each suit are considered collectively they will be found to suggest several series of four related ideas, each series suggesting a cycle. The most obvious are tabulated below.

| Cycle. | Suit 1. | Suit 2. | Suit 3. | Suit 4. |
|---|---|---|---|---|
| Life of man. | Infancy. | Youth. | Manhood. | Old age. |
| Organic life. | Generation | Growth. | Maturity. | Decay. |
| The seasons. | Spring. | Summer. | Autumn. | Winter. |

The following table illustrates some of the uses of these cards, involving the assignment of a more or less arbitrary significance to the pip-cards suggested by the topic, court-cards, colors, and geometrical figures of the particular suit.

Figure 1:
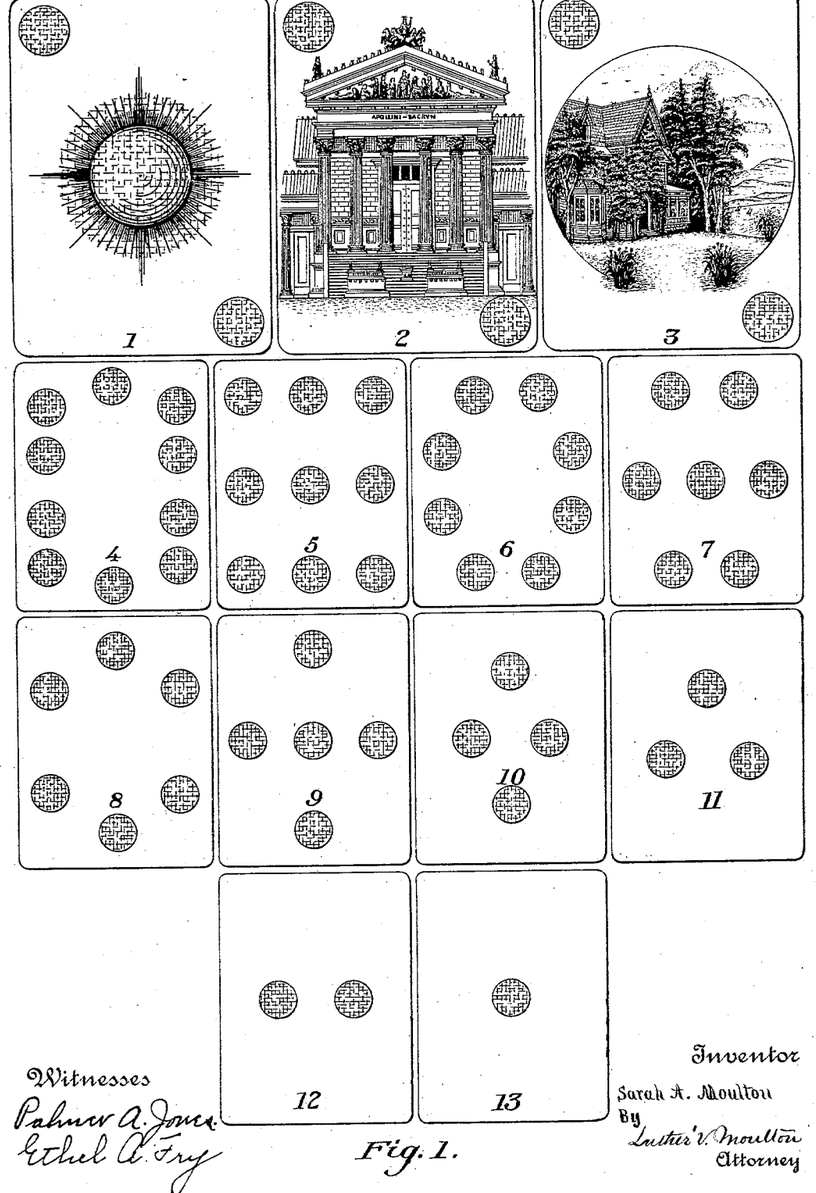

The entire suit represents Cosmic processes or the methods of nature.

| Topic. | Court-card. | Pip-card. |
|---|---|---|
| Processes of nature, &c. | 1. The Sun. | 10 spot—Intelligence. 9 spot—Force. 8 spot—Matter. |
| Orders of creation. | 2. Temple of Apollo. | 7 spot—Animal. 6 spot—Vegetable. 5 spot—Mineral. |
| Organizing forces of nature. | 3. The home. | 4 spot—Union. 3 spot—Attraction. 2 spot—Impulse. |

The unit—Cosmos or the Universe.

Figure 2:
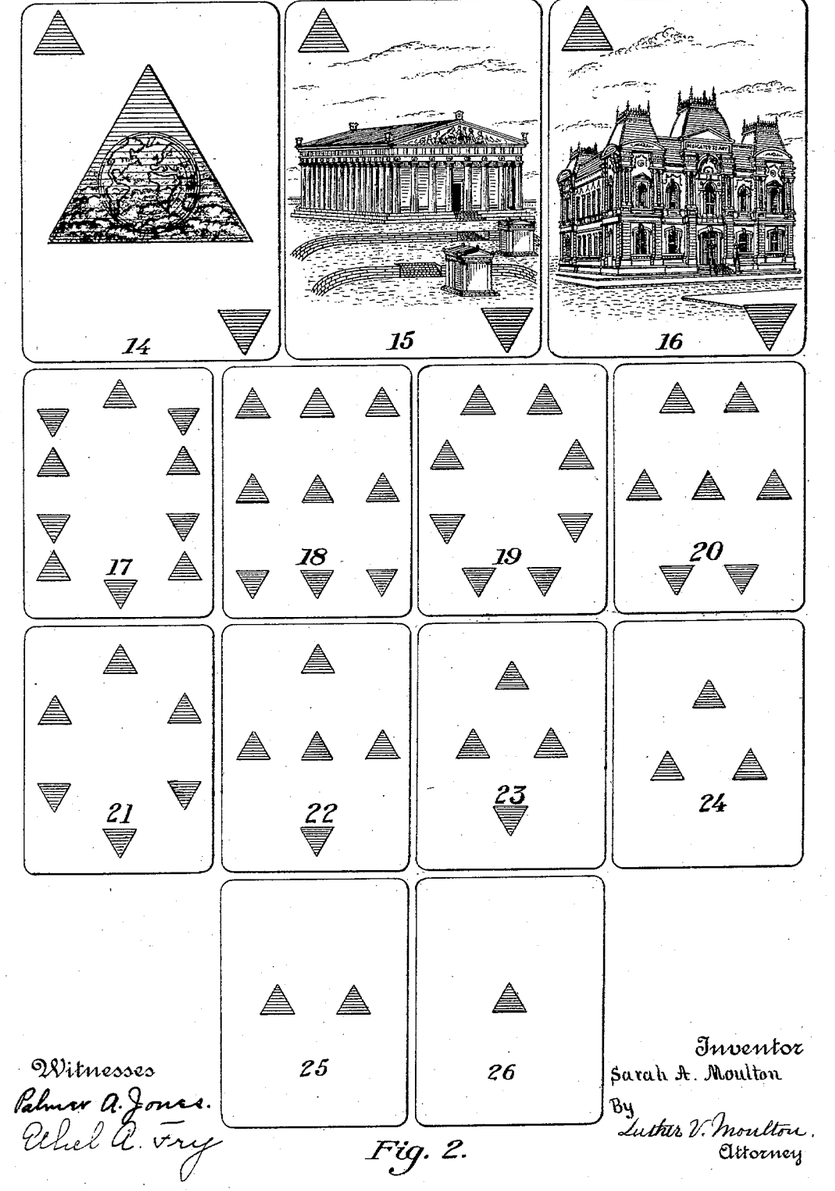

The entire suit 2 represents the mental processes, development, and achievements of man.

| Topic. | Court-card. | Pip-card. |
|---|---|---|
| Process of the mind. | 14. The Earth. | 10 spot—Knowledge 9 spot—Reason. 8 spot—Observation. |
| Science. | 15. The Parthenon. | 7 spot—Mathematics. 6 spot—Logic. 5 spot—Physics. |
| The Fine Arts. | 16. The Art-gallery. | 4 spot—Literature. 3 spot—Art proper. 2 spot—Music. |

The unit—Man considered mentally; mental evolution.

Figure 3:
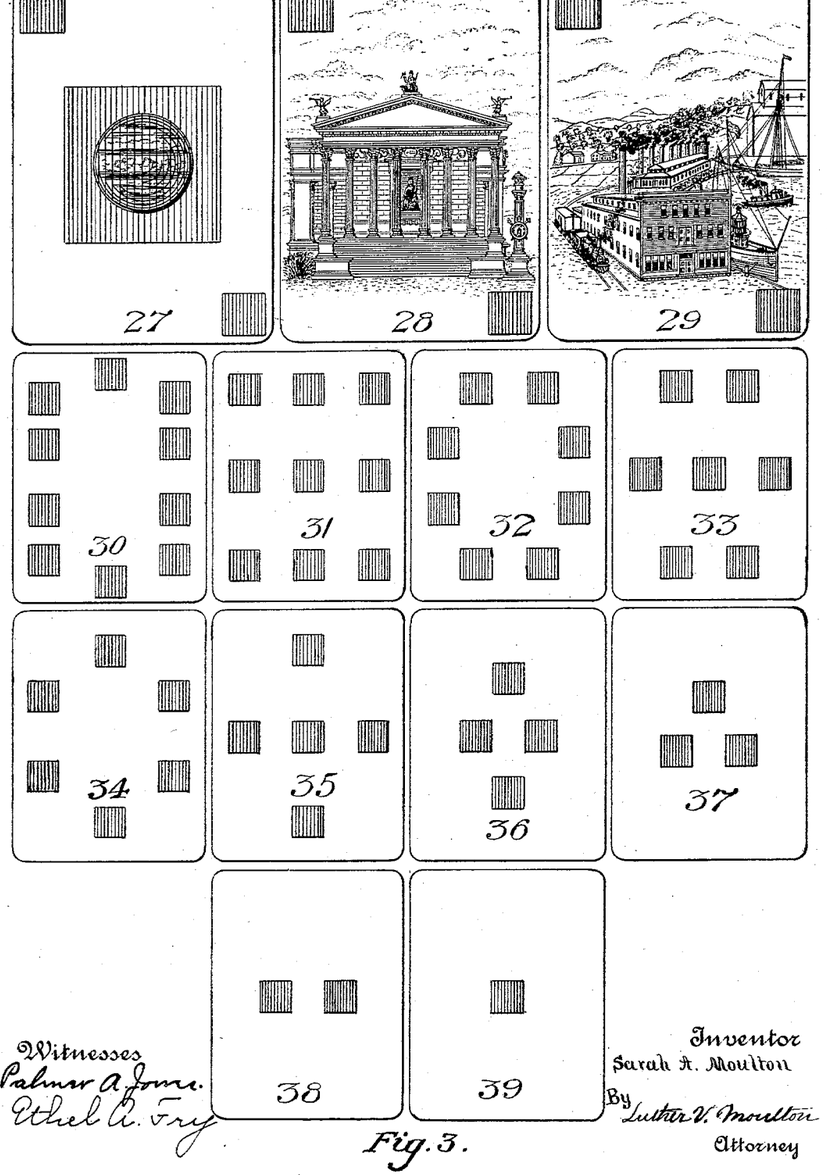

The entire suit 3 represents the methods by which man controls and directs Cosmic processes or the natural order.

| Topic. | Court-card. | Pip-card. |
|---|---|---|
| Personal forces and powers of man. | 27. Planet Jupiter. | 10 spot—Spiritual. 9 spot—Mental. 8 spot—Physical. |
| Process of producing wealth and power. | 28. Temple of Jupiter. | 7 spot—Commerce 6 spot—Manufactures. 5 spot—Agriculture. |
| Producers of wealth and power. | 29. House of Industry. | 4 spot—Inventor. 3 spot—Artisan. 2 spot—Laborer. |

The unit—Man considered physically; applied science.

Figure 4:
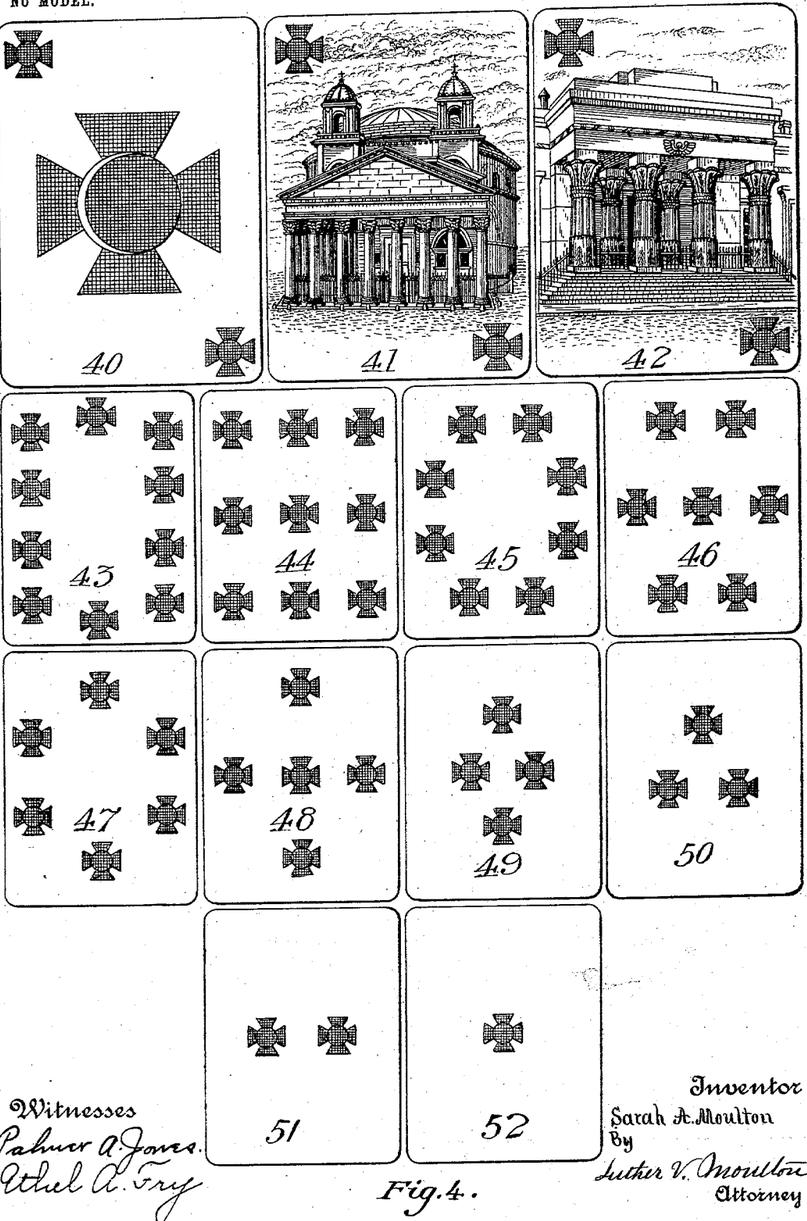

The entire suit 4 represents the retarding and destructive factors to be overcome by man.

| Topic. | Court-card. | Pip-card. |
|---|---|---|
| Mysteries. | 40. The Moon. | 10 spot—Nature's laws. 9 spot—The future 8 spot—The past. |
| Elements of weakness in mankind. | 41. The Pantheon. | 7 spot—Fear. 6 spot—Selfishness 5 spot—Ignorance. |
| Faults and vices of mankind. | 42. The prison. | 4 spot—Dishonesty 3 spot—Excesses. 2 spot—Indolence. |

The unit—Chaos or decay.

The separate pips on each card are also adapted to indicate further subdivisions of the topics—as, for instance, music is vocal and instrumental; art (proper) is painting, sculpture, and architecture; literature is history, philosophy, poetry, and fiction.

The relation of the various symbols of the respective groups to each other and to the respective topic will be readily apprehended by any one acquainted with the various matters of science, history, mythology, philosophy, theory, &c., suggested by the cards and related to the topic under consideration.

For use in cartomancy many of the symbols are adapted to be read according to the same significance that they bear for use in imparting instruction. The spheres would preferably be read according to their astrological significance. The rays of the sun would serve to indicate the time of the year, the quadrating rays indicating the four seasons and the intermediate rays the fifty-two weeks of the year. The temples would serve to indicate persons having characteristics corresponding to the respective deities to which they are dedicated. The Pantheon is adapted to indicate a person resembling any one of the various deities to which this temple was dedicated, according to its relative position to the other cards. The houses would preferably retain the same significance, as also many, if not all, of the pip-cards. The adaptation of these cards to cartomancy is thus obvious to any one familiar with the art without further explanation.

Other and various uses and meanings not here enumerated for the colors, figures, symbols, and groups of symbols on these cards may readily be found by any person suitably informed.

I do not confine myself to the particular spheres, temples, buildings, geometrical figures, or colors; but any colors, figures, or symbols adapted to suggest substantially the same ideas may be substituted without departing from the spirit of my invention.

Having thus fully described my invention, what I claim, and desire to secure by Letters Patent, is—

1. Playing-cards distinguished by several related elementary geometrical figures, whereby the cards are adapted for use in teaching geometry.

2. In playing-cards several suits distinguished by pips displaying several related geometrical figures.

3. Playing-cards distinguished by symbols displaying a circle and a triangle, whereby the cards are adapted for teaching geometry.

4. Playing-cards distinguished by a suit having circular pips and a suit having triangular pips.

5. Playing-cards distinguished by a suit having circular pips, a suit having triangular pips, and a suit having square pips.

6. Playing-cards distinguished by symbols displaying the circle, the triangle, and the square.

7. Playing-cards distinguished by symbols displaying three geometrical figures, and a fourth figure composed of the three figures combined.

8. In playing-cards four several suits, distinguished by circular pips, triangular pips, square pips; and cruciform pips, formed of the three preceding forms combined and incomplete.

9. In playing-cards several suits distinguished by pips displaying a circle or globe, a triangle or pyramid, a square or cube; and a cruciform figure composed of said three plane figures, or said three solid figures combined.

10. In playing-cards three suits severally distinguished by one of the three primary colors, yellow, blue and red.

11. In playing-cards four suits severally distinguished by the three primary colors and a color formed of said colors combined.

12. In playing-cards three suits severally distinguished by yellow pips, blue pips, and red pips.

13. In playing-cards four suits severally distinguished by yellow pips, blue pips, red pips, and black pips.

14. In playing-cards four suits severally distinguished by color, as yellow, blue, red, and black suits.

15. Playing-cards distinguished by symbols displaying related primary colors combined with related primary geometrical figures.

16. Playing-cards distinguished by yellow, blue and red symbols, said symbols also displaying the circle and the triangle.

17. Playing-cards distinguished by symbols representing the primary colors, yellow, blue and red, and the geometrical figures of a circle, a triangle, and a square.

18. Playing-cards distinguished by symbols representing the three primary colors and black, and also representing the circle, the triangle, and the square.

19. Playing-cards distinguished by symbols representing the three primary colors, and the circle, triangle, and square, and a cruciform figure formed of said figures combined.

20. Playing-cards distinguished by symbols representing the three primary colors, and a mixture of the same forming black, and also displaying the circle, the triangle, the square, and a cruciform figure formed of the said figures combined.

21. A suit of playing-cards distinguished by pip symbols substantially as described, in combination with a symbol of the sun.

22. A suit of playing-cards distinguished by pip symbols substantially as described, in combination with a representation of a temple of Apollo, or a temple of the sun-god.

23. A suit of playing-cards distinguished by pip symbols substantially as described, in combination with a representation of a cottage, home, or residence.

24. A suit of playing-cards distinguished by pip symbols substantially as described, in combination with a symbol of the earth.

25. A suit of playing-cards distinguished by pip symbols substantially as described, in combination with a representation of the Parthenon or temple of science.

26. A suit of playing-cards distinguished by pip symbols substantially as described, in combination with a representation of an art-gallery or school of fine arts.

27. A suit of playing-cards distinguished by pip symbols substantially as described, in combination with a symbol of the planet Jupiter.

28. A suit of playing-cards distinguished by pip symbols substantially as described, in combination with a representation of a temple of Jupiter or Zeus.

29. A suit of playing-cards distinguished by pip symbols substantially as described, in combination with a symbol of the industries, said symbol representing agriculture, manufacture and commerce.

30. A suit of playing-cards distinguished by pip symbols substantially as described, in combination with a symbol of the moon.

31. A suit of playing-cards distinguished by pip symbols substantially as described, in combination with a representation of the Pantheon or temple of many gods.

32. A suit of playing-cards distinguished by pip symbols substantially as described, in combination with a representation of a prison or house of correction.

33. A suit of playing-cards distinguished by pip symbols substantially as described, in combination with a symbol of the sun on a ground resembling an enlarged pip of the suit.

34. A suit of playing-cards distinguished by pip symbols substantially as described, in combination with a symbol of the earth on a ground resembling an enlarged pip of the suit.

35. A suit of playing-cards distinguished by pip symbols substantially as described, in combination with a symbol of the planet Jupiter on a ground resembling an enlarged pip of the suit.

36. A suit of playing-cards distinguished by pip symbols substantially as described, in combination with a symbol of the moon on a ground resembling an enlarged pip of the suit.

37. A suit of playing-cards distinguished by a symbol of the sun having fifty-two radiating rays representing the weeks of a year, and four quadrating rays representing the seasons of the same.

38. In playing-cards adapted for education or cartomancy, a symbol of the industries consisting of a representation of a group of the means of carrying on agriculture, manufacturing, and commerce.

39. In playing-cards adapted for education or cartomancy, a symbol of the industries consisting of a representation of a farm, a factory or mill, a warehouse, and a railway, or one or more steam or sailing vessels.

40. Playing-cards distinguished by pip symbols substantially as described, in combination with a series of symbols representing several spheres of the solar system.

41. Playing-cards distinguished by pip symbols substantially as described, in combination with symbols representing the sun, the earth, the planet Jupiter, and the moon.

42. Playing-cards distinguished by pip symbols substantially as described, in combination with symbols representing several spheres of the solar system, and a series of ancient temples, severally related to the respective spheres.

43. Playing-cards distinguished by pip symbols substantially as described, in combination with symbols representing the sun and a temple of Apollo; the earth and the Parthenon; the planet Jupiter and a temple of Jupiter; the moon and the Pantheon.

44. Playing-cards distinguished by pip symbols substantially as described, in combination with symbols representing several spheres of the solar system; a series of ancient temples severally related to the respective spheres; and a series of modern structures symbolically related to the respective spheres and temples.

45. Playing-cards distinguished by pip symbols substantially as described, in combination with symbols representing the sun, a temple of Apollo and a cottage; the earth, the Parthenon and an art-gallery; the planet Jupiter, a temple of Jupiter and the industries; the moon, the Pantheon and a prison.

46. A suit of playing-cards distinguished by pip symbols substantially as described, in combination with symbols representing the sun, a temple of Apollo, and a cottage.

47. A suit of playing-cards distinguished by pip symbols substantially as described, in combination with symbols representing the earth, the Parthenon, and an art-gallery.

48. A suit of playing-cards distinguished by pip symbols substantially as described, in combination with symbols representing the planet Jupiter, a temple of Jupiter, and the industries.

49. A suit of playing-cards distinguished by pip symbols substantially as described, in combination with symbols representing the moon, the Pantheon and a prison.

50. A suit of playing-cards distinguished by pip symbols substantially as described in combination with a temple of Apollo and a modern cottage.

51. A suit of playing-cards distinguished by pip symbols substantially as described, in combination with a temple dedicated to Pallas Athene or Minerva, and an art-gallery.

52. A suit of playing-cards distinguished by pip symbols substantially as described, in combination with a temple dedicated to Jupiter or Zeus, and a symbol of the industries.

53. A suit of playing-cards distinguished by pip symbols substantially as described, in combination with a representation of the Pantheon or a temple of many gods and a prison.

54. Two suits of playing-cards distinguished by pip symbols substantially as described, in combination with symbols of the sun, a temple of Apollo, and a cottage; the moon, the Pantheon and a prison.

55. Playing-cards distinguished by pip symbols substantially as described, in combination with symbols representing a related series of ancient temples, and a corresponding related series of modern structures, severally related to the several temples.

56. Playing-cards distinguished by pip symbols substantially as described, in combination with symbols representing a temple of Apollo, and a cottage; the Parthenon, and an art-gallery; a temple of Jupiter and the industries, the Pantheon and a prison.

57. Playing-cards distinguished by the following symbols; a series representing spheres of the solar system; a corresponding series representing ancient temples; and a corresponding series representing modern structures; said several series being adapted for use in place of the usual kings, queens, and jacks; and pip symbols adapted for use in place of the ordinary pips substantially as described.

58. Playing-cards distinguished by symbols representing several series of related objects, and pip symbols displaying a corresponding series of several related geometrical figures.

59. Playing-cards distinguished by symbols representing several series of related objects, and pip symbols displaying a corresponding series of related colors.

60. Playing-cards distinguished by symbols representing several series of related objects, and a corresponding series of symbols displaying a series of related primary geometrical figures, and a series of related primary colors.

61. Playing-cards distinguished by symbols representing a series of related spheres of the solar system; a corresponding related series of ancient temples; a corresponding series of related geometrical figures.

62. Playing-cards distinguished by symbols representing a series of related spheres of the solar system; a corresponding series of ancient temples; a corresponding series of modern structures; and a corresponding series of related colors.

63. Playing-cards distinguished by symbols representing a series of related spheres of the solar system; a corresponding series of related ancient temples; a corresponding series of related modern structures; a corresponding series of related colors; and a series of related geometrical figures.

64. Playing-cards distinguished by symbols representing the sun, a temple of Apollo, a cottage and circular pips; the earth, the Parthenon, an art-gallery and triangular pips; the planet Jupiter, a temple of Jupiter, the industries, and square pips; the moon, the Pantheon, a prison, and cruciform pips.

65. Playing-cards distinguished by symbols representing the sun, a temple of Apollo, a cottage and yellow pips; the earth, the Parthenon, an art-gallery and blue pips; the planet Jupiter, a temple of Jupiter the industries and red pips; the moon, the Pantheon, a prison, and black pips.

66. Playing-cards distinguished by symbols representing the sun, a temple of Apollo, a cottage, and circular yellow pips; the earth, the Parthenon, an art-gallery and triangular blue pips; the planet Jupiter, a temple of Jupiter, the industries and square red pips; the moon, the Pantheon, a prison and cruciform black pips.

67. Playing-cards distinguished by symbols as follows; a series of symbols representing spheres of the solar system; a series representing ancient temples; and a series representing modern structures, the same being severally adapted for use in place of the usual kings, queens, and jacks, and the several spheres, temples and houses of each series having a related significance, whereby the cards are adapted for playing the usual games, and also adapted for use for instruction, or for cartomancy.

68. Playing-cards distinguished by symbols representing the following objects, and adapted and related as described; the sun, the earth, the planet Jupiter, and the moon; a temple of Apollo, a temple of Pallas Athene or Minerva, a temple of Jupiter or Zeus, and the Pantheon; a modern cottage, an art-gallery or school of the fine arts, a composite picture representing agriculture, manufacture, and commerce, and a prison.

69. Four suits of playing-cards distinguished by symbols representing the sun and a temple of Apollo; the earth and a temple of Pallas Athene or Minerva; the planet Jupiter and a temple of Jupiter or Zeus; the moon and the Pantheon.

70. In a pack of playing-cards adapted for education, and for cartomancy; court-cards having symbols adapted to indicate the relative value of the cards according to the usual values of the corresponding playing-cards, each of said symbols also representing some natural or artificial object adapted to suggest a scientific, philosophic, or mythologic topic; and pip-cards adapted to be grouped with the respective court-cards, and thus further illustrate the topic by either their form or color, or by arbitrary significance, suggested by the court-card with which they are grouped.

71. In playing-cards the following combination of symbols and color; a suit having the sun and yellow; a suit having the earth and blue; a suit having the planet Jupiter and red; and a suit having the moon and black.

72. In playing-cards the following combination of symbols, figures, and colors; four suits having respectively; the sun and a circular yellow figure; the earth and a triangular blue figure; the planet Jupiter and a square red figure; the moon and a black cruciform figure composed of the three preceding figures, incomplete, and arranged substantially as described.

73. In playing-cards the following combination of symbols and colors; four suits having respectively; the sun on a circular yellow ground, a temple of Apollo, and circular yellow pips; the earth on a triangular blue ground, a temple of Athene or Minerva, and triangular blue pips; the planet Jupiter on a square red ground, a temple of Jupiter or Zeus, and square red pips; the moon on an incomplete square black ground, the Pantheon, and black cruciform pips.

74. Playing-cards distinguished by pip symbols substantially as described, in combination with symbols representing a cottage, an art-gallery, the industries and a prison.

75. Playing-cards distinguished by pip symbols substantially as described in combination with symbols representing the sun and a cottage; the earth and an art-gallery; the planet Jupiter and the industries; the moon and a prison.

76. Playing-cards distinguished by pip symbols substantially as described, in combination with symbols representing a temple of Apollo, a temple of Pallas Athene or Minerva, a temple of Jupiter or Zeus, and the Pantheon.

77. Two suits of playing-cards distinguished by pip symbols substantially as described, in combination with symbols representing the sun, a temple of Apollo, and a cottage; the earth, the Parthenon, and an art-gallery.

78. Three suits of playing-cards distinguished by pip symbols substantially as described; in combination with symbols representing the sun, a temple of Apollo, and a cottage; the earth, the Parthenon, and an art-gallery; the planet Jupiter, a temple of Jupiter, and the industries.

In testimony whereof I affix my signature in presence of two witnesses.

SARAH A. MOULTON.

Witnesses:
LUTHER V. MOULTON,
W. B. ACKER.